United States Patent [19]

Colpaert

[11] Patent Number: 4,685,542
[45] Date of Patent: Aug. 11, 1987

[54] DISC BRAKE ASSEMBLY

[75] Inventor: James J. Colpaert, Granger, Ind.

[73] Assignee: Allied Corporation, Morristown, N.J.

[21] Appl. No.: 323,841

[22] Filed: Nov. 23, 1981

[51] Int. Cl.$^4$ .............................................. F16D 55/22
[52] U.S. Cl. .................................. 188/72.3; 188/71.8; 188/73.45; 188/196 P
[58] Field of Search ................. 188/72.3, 73.43, 73.44, 188/73.45, 216, 71.8, 196 P; 192/70-78

[56] References Cited

U.S. PATENT DOCUMENTS

| Re. 30,255 | 4/1980 | Roth et al. | 188/73.45 |
|---|---|---|---|
| 3,392,808 | 7/1968 | Soltis, Jr. | 188/216 X |
| 3,532,191 | 10/1970 | Burnett et al. | 188/71.3 |
| 3,616,876 | 11/1971 | Brooks | 188/73.3 |
| 3,881,576 | 5/1975 | Haraikawa et al. | 188/73.45 X |
| 4,084,665 | 4/1978 | Burnett | 188/73.45 |
| 4,244,451 | 1/1981 | Johannesen | 188/73.3 |
| 4,318,458 | 3/1982 | Ritsema | 188/73.44 |

FOREIGN PATENT DOCUMENTS

| 0035946 | 9/1981 | European Pat. Off. | 423/397 |
|---|---|---|---|
| 1930685 | 11/1979 | Fed. Rep. of Germany | 188/73.43 |
| 2249574 | 5/1975 | France | 188/73.43 |
| 1255079 | 11/1971 | United Kingdom | 215/273 |
| 1499811 | 2/1978 | United Kingdom | 81/48 |
| 2033989 | 5/1980 | United Kingdom | 112/415 |
| 2037385 | 7/1980 | United Kingdom | 188/73.45 |

Primary Examiner—George E. A. Halvosa
Attorney, Agent, or Firm—Larry J. Palguta; Ken C. Decker

[57] ABSTRACT

A disc brake comprises a caliper member (14) which is movably supported relative to a torque member (12) by at least one pin assembly (46). The one pin assembly comprises a first part (50) and a second part (54) with a resilient member (70) therebetween. The resilient member (70) cooperates with the parts (50, 54) and the caliper member (14) to positively retract a friction element (24) upon termination of braking.

2 Claims, 6 Drawing Figures

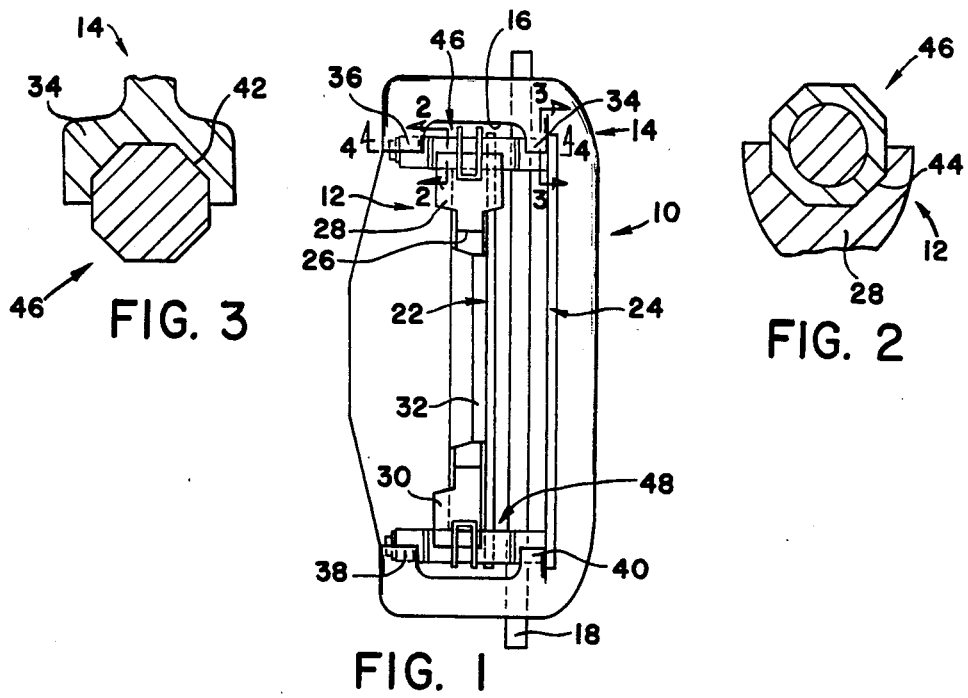
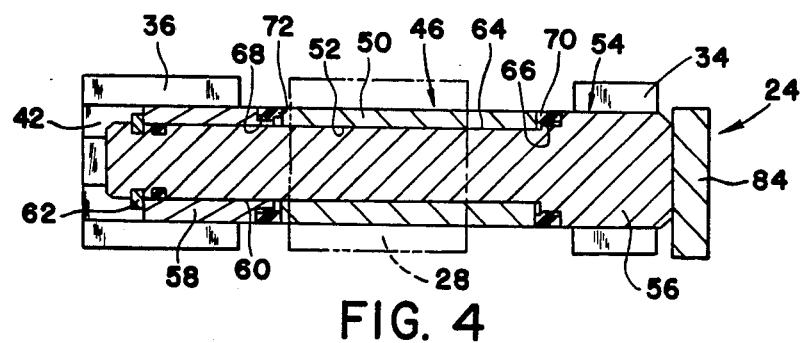
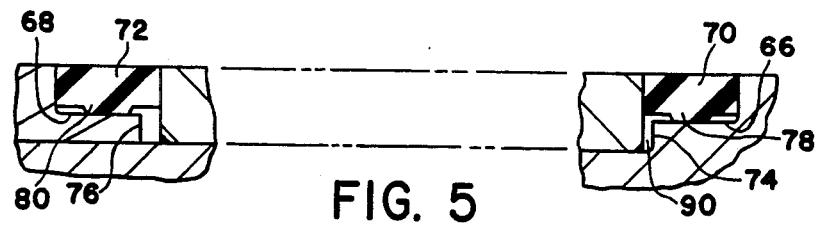
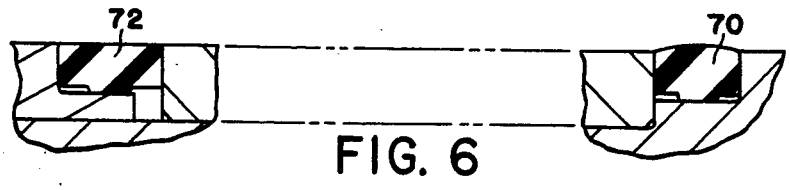

DISC BRAKE ASSEMBLY

This invention relates to a disc brake assembly. More particularly, a disc brake assembly includes a pin assembly disposed between a torque member and a caliper member to permit the caliper member to move relative to the torque member during braking. The pin assembly is carried within slots on the torque member and the caliper member.

During braking a pair of friction elements are urged into engagement with a rotor to be braked by the caliper member. Fluid pressure communicated to the caliper member directly urges the inner friction element toward the rotor to generate reaction forces on the caliper member which cause the caliper member to move and engage the outer friction element with the rotor. Upon termination of braking the fluid pressure in the caliper member is eliminated so that the pair of friction elements are substantially free to slightly separate from the rotor in response to rotor "knockback", vibration and piston retraction. However, in view of the resistance of the sliding surfaces between the caliper member and the torque member, it is believed that the outer friction element remains slightly in engagement with the rotor, thereby creating drag for the rotor. The drag adversely affects the efficiency for a vehicle incorporating such a disc brake.

The prior art is illustrated by U.S. Pat. No. 4,084,665 (Burnett) issued Apr. 18, 1975, U.S. Pat. No. 4,244,451 (Johannesen) issued Jan. 13, 1981, U.S. Pat. No. 3,532,191 (Burnett, et al.) issued Oct. 6, 1970 and U.S. Pat. No. 3,616,876 (Brooks) issued Nov. 2, 1971.

The present invention provides a disc brake assembly comprising a torque member disposed substantially adjacent a rotor to be braked, a caliper member movably disposed relative to the rotor and cooperating with a pair of friction elements to engage the latter with the rotor during braking, at least one pin assembly forming a movable connection between the caliper member and the torque member, the torque member defining an axially extending slot receiving a first portion of the one pin assembly and the caliper member defining an axially extending slot receiving a second portion of the one pin assembly, characterized in that said one pin assembly comprises a plurality of parts, a first part engaging one of said members, a second part engaging the other of said members and a third part comprising a resilient member engageable with said first and second parts to resist movement of said first and second parts away from a rest position, said first and second parts defining a spacing in the rest position and said first and second parts being movable during braking to take up the spacing, said resilient member biasing said first and second parts and said members to move upon termination of braking such that the spacing is reestablished between said first and second parts and one of the pair of friction elements is moved with one of the members slightly away from the rotor.

It is an advantage of the present invention that the outer friction element is positively moved out of engagement with the rotor a predetermined amount by the pin assembly.

FIG. 1 is a top view of a disc brake constructed in accordance with the present invention;

FIG. 2 is a cross sectional view taken along line 2—2 of FIG. 1;

FIG. 3 is a cross sectional view taken along line 3—3 of FIG. 1;

FIG. 4 is an enlarged cross sectional view along line 4—4 of the pin assembly shown in FIG. 1;

FIG. 5 is a partial view of the pin assembly in FIG. 4 shown in a rest position; and FIG. 6 is a view similar to FIG. 5 showing the pin assembly in a braking position.

The disc brake assembly 10 comprises a torque member 12 secured to a nonrotatable portion of a vehicle (not shown), and a caliper member 14. The caliper member 14 forms a central opening 16 for receiving the torque member 12. A rotor 18 rotatably coupled to a wheel assembly (not shown) for the vehicle is partially received within the central opening 16 and a pair of friction elements 22, 24 carried by the caliper member are disposed on opposite sides of the rotor 18. In the alternative, the pair of friction elements 22, 24 could be carried by the torque member 12 to avoid transferring braking torque through the caliper member. A recess 26 on the torque member 12 separates a pair of arms 28, 30 and also forms an opening for receiving a piston 32 carried by the caliper member 14. In a conventional manner, the inner friction element 22 is directly urged into engagement with the rotor 18 during braking by the piston 32 while the outer friction element 24 is indirectly urged into engagement with the rotor in response to reaction forces biasing the caliper member to move.

In order to carry the caliper member 14 relative to the torque member, the caliper member is provided with four ears 34, 36, 38 and 40, each defining axially extending slots 42. Only ear 34 is shown in FIG. 3 since the ears are substantially similar. The torque member arms 28 and 30 are also formed with axially extending slots 44 so that a pair of pin assemblies 46 and 48 extend partially into the respective slots for ears 34, 36 and arm 28 and ears 38, 40 and arm 30. Since the pin assembly 46 is identical to the pin assembly 48, the description follows with reference to only pin assembly 46; however, the features for pin 46 are equally applicable for pin 48.

Turning to FIG. 4, the pin assembly 46 comprises a first part 50 engageable with the torque member arm 28. The first part 50 forms a bore 52 for receiving a second part 54 of the pin assembly 46. The second part engages the caliper member ears 34 and 36 and is made from a first element 56 and a second element 58. The second element has a bore 60 for receiving the first element 56. A snap ring 62 prevents separation between the first and second elements, the first and second parts, and a pair of resilient members 70 and 72 after the pin assembly 46 is assembled. The second part 54 has a recess 64 for carrying the first part 50. The axial length of the recess is greater than the axial length of the first part 50. The second part 54 is stepped adjacent the recess to form annular grooves 66 and 68. The pair of resilient members 70 and 72 are disposed within the respective grooves 66 and 68. The pair of resilient members 70 and 72 are deformed axially to fit within the grooves so that in the rest position of FIG. 5, the resilient members engage the first part 50 and the second part 54 to position the first part at an intermediate location spaced from shoulders 74 and 76 defined by recess 64. In the alternative, the recess could be dimensioned so that the first part 50 could abut shoulder 76 and be spaced from shoulder 74 in the rest position. Each resilient member includes an inwardly extending projection 78 and 80 engaging the bottom wall of groove 66 and 68, respectively. Consequently, each resilient member 70 and 72 forms a gap with the wall of each groove for a purpose to be described hereinafter.

As shown more clearly in FIG. 4, the outer friction element 24 includes a backing plate 84 and the pin assembly 46 is engageable with the backing plate 84.

In the rest position of FIG. 5, the first part 50 is located within recess 64 by the resilient members 70 and 72 to form a predetermined clearance 90 between the first part 50 and the shoulder 74. The predetermined clearance is preferably dimensioned to equal the desired clearance between the rotor 18 and the outer friction element 24. During a brake application, the caliper member is pressurized so that the piston 32 directly moves the inner friction element into engagement with the rotor 18. Increasing fluid pressure within the caliper member creates a reaction force on the caliper member so that the caliper member moves to the left in FIGS. 1 and 4 to move the outer friction element into engagement with the rotor 18. Viewing FIGS. 4-6, the ears 34 and 36 and the backing plate 84 also move to the left with the caliper member during braking so that the pin assembly second part 54 moves to the left relative to the torque member 28. The friction forces at the interface between the first part 50 and the torque member 28 are greater than the forces of resilient member 70 opposing movement of the part 54 to the left relative to the part 50. Consequently, the part 54 moves with the caliper member relative to the torque member and relative to the part 50 during braking axially contract the resilient member 70. The resilient member 70 substantialy fills up the gap in recess 66 to generate a retraction force between the pin assembly parts 50 and 54. While the resilient member 70 is being contracted axially, the axial length of groove 68 is being increased to permit expansion of resilient member 72 during braking. The position of the pin assembly 46 during braking is shown in FIG. 6.

Upon termination of braking, the fluid pressure within the caliper member is reduced, so that the piston 32 is retracted within the caliper member. Also, the retraction force within resilient member 70 biases the pin assembly parts 50 and 54 to separate so that the part 54 moves to the right to carry the caliper member to the right and move the outer friction element away from the rotor 18.

If the friction elements wear, the part 50 is slidable relative to the torque member 28 to adjust for the lining wear. However, even with adjustment, the pin assembly 46 will continue to positively retract the outer friction element upon termination of braking.

There are many variations to the present invention as described above which are feasible by one skilled in the art. As such, these variations are included within the scope of the appended claims.

I claim:

1. A disc brake assembly comprising a torque member disposed substantially adjacent a rotor to be braked, a caliper member movably disposed relative to the rotor and cooperating with a pair of friction elements to engage the latter with the rotor during braking, at least one pin assembly forming a movable connection between the caliper member and the torque member, the torque member defining an axially extending slot receiving a first portion of the one pin assembly and the caliper member defining an axially extending slot receiving a second portion of the one pin assembly, characterized in that said one pin assembly comprises a plurality of parts, a first part engaging said torque member and spaced from said caliper member, a second part engaging said caliper member and spaced from said torque member via said first part, and a third part comprising a resilient member engageable with said first and second parts to resist movement of said first and second parts away from a rest position, said first and second parts defining a spacing in the rest position and said first and second parts being moveable during braking to take up the spacing, said resilient member biasing said first and second parts to move upon termination of braking such that the spacing is reestablished between said first and second parts, said second part directly abutting one of said pair of friction elements whereby said one friction element is moved directly with said second part to a position slightly away from the rotor upon termination of braking, said first part comprising a cylindrical sleeve and said second part includes a recess extending between shoulders for movably receiving said cylindrical sleeve, said cylindrical sleeve being normally spaced from one of said shoulders by said resilient member.

2. A disc brake assembly comprising a torque member disposed adjacent a rotor to be braked, a caliper member cooperating with a pair of friction elements to engage the latter with the rotor during braking, and at least one pin assembly engaging the caliper member and the torque member to movably support the caliper member relative to the torque member, the pin assembly comprising a plurality of parts, a first part engaged with the torque member and spaced from the caliper member, a second part engaged with the caliper member to move therewith and spaced from the torque member via said first part, a third part comprising a resilient member disposed between the first and second parts, and a fourth part comprising a seal sealingly engaging the first and second parts, the resilient member being deformable during braking as the second part moves with the caliper member, the resilient member biasing the caliper via the second member to return to its rest position upon termination of braking, the seal remaining in sealing engagement with the first and second parts at all times to protect a sliding interface therebetween and the second part defining a recess to movably receive the first part therein, the resilient member being disposed at one end of the recess between said parts and the seal being disposed at an opposite end of the recess between said parts, said second part further comprising two elements engageable with the caliper member and the two elements are separable to permit connection of said first and second parts.

* * * * *